US012667972B2

(12) United States Patent
Savkin et al.

(10) Patent No.: US 12,667,972 B2
(45) Date of Patent: Jun. 30, 2026

(54) COMMODITY TRANSFER APPARATUS AND CONTROL METHOD FOR SAME

(71) Applicant: TELEXISTENCE INC., Tokyo (JP)

(72) Inventors: Pavel Savkin, Tokyo (JP); Nathan Quinn, Tokyo (JP)

(73) Assignee: Telexistence Inc., Tokyo (JP)

( * ) Notice: Subject to any disclaimer, the term of this patent is extended or adjusted under 35 U.S.C. 154(b) by 52 days.

(21) Appl. No.: 18/848,739

(22) PCT Filed: Mar. 24, 2023

(86) PCT No.: PCT/JP2023/011753
§ 371 (c)(1),
(2) Date: Sep. 19, 2024

(87) PCT Pub. No.: WO2023/190123
PCT Pub. Date: Oct. 5, 2023

(65) Prior Publication Data
US 2025/0205899 A1 Jun. 26, 2025

(30) Foreign Application Priority Data

Mar. 29, 2022 (JP) ................................. 2022-052994
Jul. 14, 2022 (JP) ................................. 2022-112891

(51) Int. Cl.
*G06T 7/70* (2017.01)
*A47F 13/00* (2006.01)
(Continued)

(52) U.S. Cl.
CPC ............. *B25J 9/1697* (2013.01); *A47F 13/00* (2013.01); *B25J 5/00* (2013.01); *B25J 9/162* (2013.01);
(Continued)

(58) Field of Classification Search
CPC ... B25J 9/1697; B25J 5/00; B25J 9/162; B25J 9/163; B25J 9/1664; B25J 11/008;
(Continued)

(56) References Cited

U.S. PATENT DOCUMENTS

2018/0127212 A1* 5/2018 Jarvis ................... B65G 1/1375
2018/0260628 A1* 9/2018 Namiki ............... G06F 18/2413
(Continued)

FOREIGN PATENT DOCUMENTS

JP 2011-92482 A 5/2011
JP 2011092482 A * 5/2011
(Continued)

OTHER PUBLICATIONS

International Search Report from the priority application PCT/JP2023/011753, mailed on Apr. 25, 2023.
(Continued)

*Primary Examiner* — Sohana Tanju Khayer
(74) *Attorney, Agent, or Firm* — MEAGHER EMANUEL LAKS GOLDBERG & LIAO, LLP

(57) ABSTRACT

According to one embodiment of the present disclosure, a product transfer apparatus is provided. The product transfer apparatus includes an arm unit having a holder unit for holding a product, an image capture unit for obtaining image data including at least a portion of the product held by the holder unit for placing the product on a shelf plate of the product display shelf and placed above the front side of the shelf plate by the arm unit, and at least a portion of the shelf plate. The control unit is configured to identify, based on the image data, the relationship between the height of a reference position of the product from an upper surface of the shelf plate and the height of a reference position of the shelf plate, and correct, based on the identified relationship, the height of the reference position of the product relative to the
(Continued)

(a) (b)

reference position of the shelf plate by operating the arm unit for moving the product.

8 Claims, 11 Drawing Sheets

(51) Int. Cl.

| | |
|---|---|
| *B25J 5/00* | (2006.01) |
| *B25J 9/16* | (2006.01) |
| *B25J 11/00* | (2006.01) |
| *B25J 13/08* | (2006.01) |
| *B25J 19/02* | (2006.01) |
| *B65G 1/00* | (2006.01) |
| *B65G 1/04* | (2006.01) |
| *B65G 47/90* | (2006.01) |

(52) U.S. Cl.
CPC ............. *B25J 9/163* (2013.01); *B25J 9/1664* (2013.01); *B25J 11/008* (2013.01); *B25J 13/08* (2013.01); *B25J 19/02* (2013.01); *B65G 1/00* (2013.01); *B65G 1/0492* (2013.01); *B65G 47/90* (2013.01); *B65G 47/905* (2013.01); *G06T 7/70* (2017.01); *G06T 2207/20081* (2013.01)

(58) Field of Classification Search
CPC . B25J 13/08; B25J 19/02; A47F 13/00; A47F 10/02; A47F 2010/025; B65G 1/00; B65G 1/0492; B65G 47/90; B65G 47/905; G06T 7/70; G06T 2207/20081
See application file for complete search history.

(56) References Cited

U.S. PATENT DOCUMENTS

| | | | | |
|---|---|---|---|---|
| 2019/0171220 A1* | 6/2019 | Elazary | ............... | B65G 1/1375 |
| 2020/0242541 A1* | 7/2020 | Kinno | ................... | G06Q 30/06 |
| 2022/0088795 A1* | 3/2022 | Aoki | ..................... | B25J 9/1697 |

FOREIGN PATENT DOCUMENTS

| | | | |
|---|---|---|---|
| JP | 2020-11308 A | | 1/2020 |
| JP | 2020130192 A | * | 8/2020 |

OTHER PUBLICATIONS

Written Opinion from the priority application PCT/JP2023/011753, mailed on Apr. 25, 2023.

International Search Report from the priority application PCT/JP2023/011752 for U.S. Appl. No. 18/848,723, mailed on Apr. 25, 2023.

Written Opinion from the priority application PCT/JP2023/011753 for U.S. Appl. No. 18/848,723, mailed on Apr. 25, 2023.

* cited by examiner

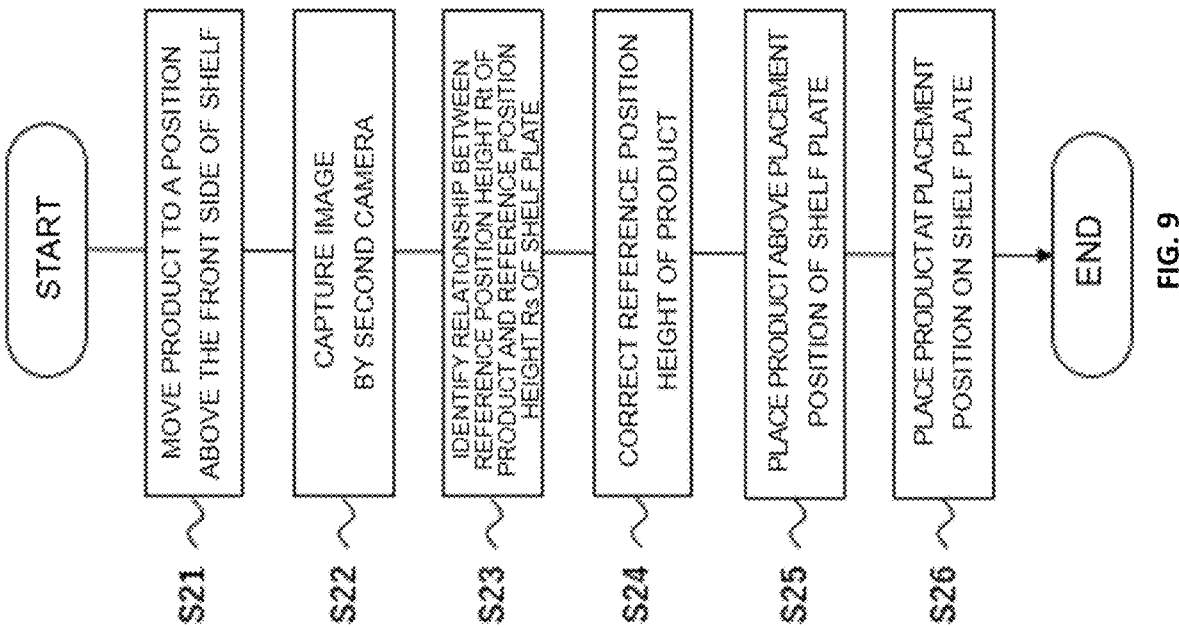

START

S21　MOVE PRODUCT TO A POSITION ABOVE THE FRONT SIDE OF SHELF

S22　CAPTURE IMAGE BY SECOND CAMERA

S23　IDENTIFY RELATIONSHIP BETWEEN REFERENCE POSITION HEIGHT Rf OF PRODUCT AND REFERENCE POSITION HEIGHT Rs OF SHELF PLATE

S24　CORRECT REFERENCE POSITION HEIGHT OF PRODUCT

S25　PLACE PRODUCT ABOVE PLACEMENT POSITION OF SHELF PLATE

S26　PLACE PRODUCT AT PLACEMENT POSITION ON SHELF PLATE

END

FIG. 9

COMMODITY TRANSFER APPARATUS AND CONTROL METHOD FOR SAME

TECHNICAL FIELD

The present disclosure relates to a product transfer apparatus and a method of controlling the product transfer apparatus.

BACKGROUND

JP2018-110755 discloses a product replenishment system which performs unmanned replenishment of products to reduce work labor. This product replenishment system includes an image capture device for capturing an image of a product as a target of replenishment, and a multi-joint robot apparatus for moving the product. The multi-joint robot apparatus picks up a product as the target of replenishment from a predetermined position where the product is placed beforehand, and moves the product to a product display shelf.

SUMMARY

In the system described in JP2018-110755, in general, the position of the product display shelf recognized by the system through an image recognition technique, etc. may be different from the actual position of the product display shelf. For example, at the time of displaying products on a lower shelf plate of a product display shelf having upper and lower two levels, in the state where the product is at a height where the product contacts either the upper or lower shelf plates, if operation to move the product on the shelf plate is performed, the product may contact the edge on the front side of the shelf plate, and it becomes impossible to move the product further, or the product may be detached from the robot hand.

Further, even in the case where the product can be placed above the lower shelf plate through a space between the two levels of (upper and lower) shelf plates, if the distance between the bottom surface of the product and the upper surface of the shelf plate is large, and in this state, the robot hand performs operation of releasing the product and placing the product on the shelf plate, the product may fall over due to the impact when the product dropped onto the shelf plate.

An object of the present disclosure is to provide a product transfer apparatus, etc. which enables correction of the position of the movement destination of a product in the case where the position of the product is different from the intended position.

According to an aspect of the present disclosure, a product transfer apparatus configured to move a product placed on a stock shelf to a product display shelf which is different from the stock shelf is provided. The product transfer apparatus comprises an arm unit having a holder unit configured to hold the product; an image capture unit configured to obtain image data including at least a portion of the product held by the holder unit for placing the product on a shelf plate of the product display shelf and placed above the front side of the shelf plate by the arm unit, and at least a portion of the shelf plate; and a control unit configured to control operation of the holder unit, the arm unit, and the image capture unit. The control unit is configured to perform: identifying, based on the image data, the relationship between the height of a reference position of the product from an upper surface of the shelf plate and the height of a reference position of the shelf plate; and correcting, based on the identified relationship, the height of the reference position of the product relative to the reference position of the shelf plate by operating the arm unit for moving the product.

Other features and advantages of the present disclosure can be understood from the following description and the accompanying drawings which are given in an illustrative and non-comprehensive manner.

According to the present disclosure, a product transfer apparatus, etc. which enables correction of the position of the movement destination of a product in the case where the position of the product at the movement destination is different from the intended position is provided.

BRIEF DESCRIPTION OF THE DRAWINGS

FIG. 9 is a flow chart showing a first operation example of the product transfer apparatus.

DETAILED DESCRIPTION

Hereinafter, an embodiment of the present disclosure will be described with reference to the drawings.
<Layout Structure of Store>

Figure 1:
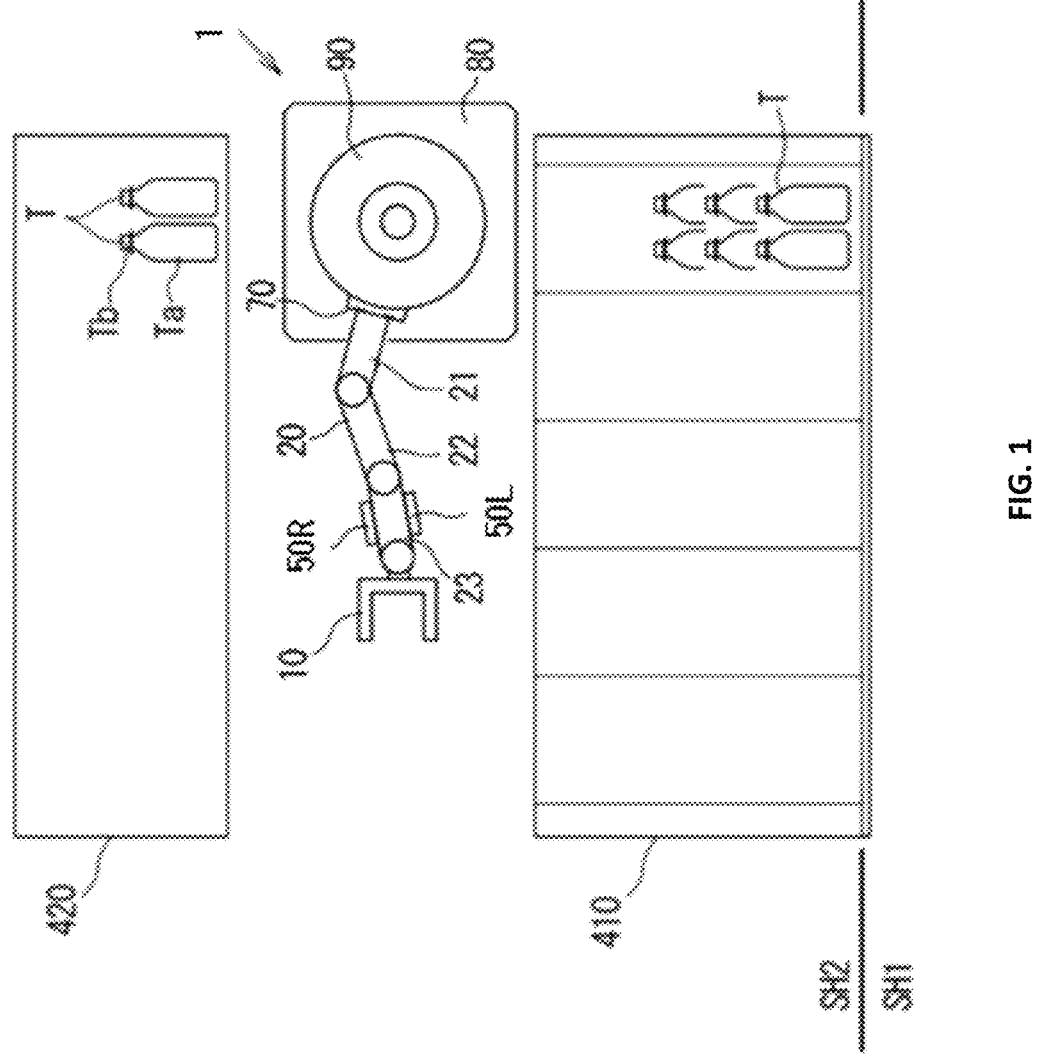
FIG. 1 is a plan view schematically showing the layout of shelves in a store and a product transfer apparatus provided in the store.
Figure 2:
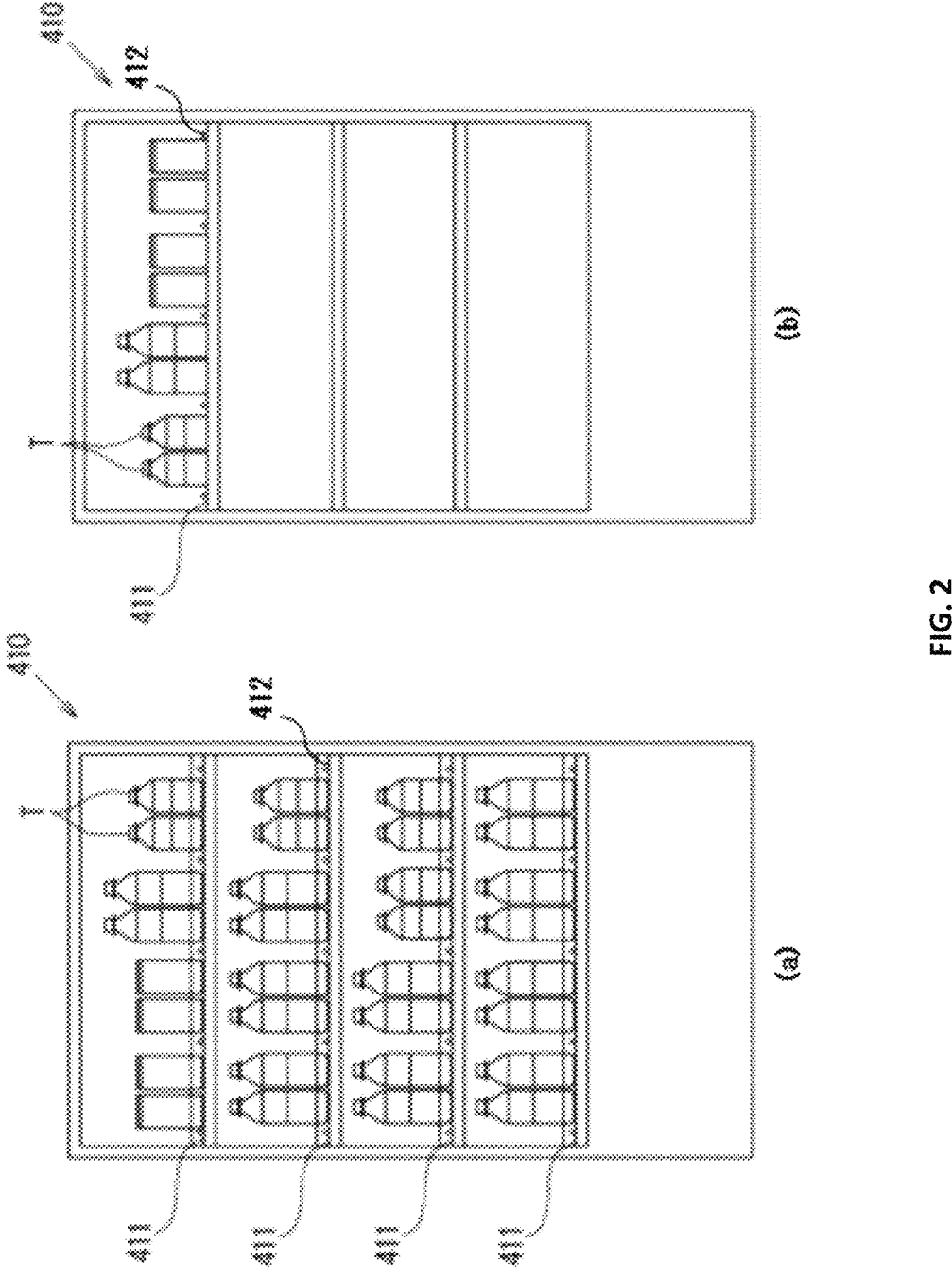
FIG. 2($a$) is a view showing a product display shelf viewed from the front side, and FIG. 2($b$) is a view showing the product display shelf viewed from the back side.

Firstly, layout structure of a store will be described. FIG. 1 is a plan view schematically showing the layout of shelves in a store and a product transfer apparatus provided in the store. FIG. 2($a$) is a view showing a product display shelf viewed from the front side, and FIG. 2($b$) is a view showing the product display shelf viewed from the back side.

As shown in FIG. 1, the inside of the store is divided into an in-store space SH1 and a backyard space SH2. The in-store space SH1 is a space where customers select and purchase products T. The backyard space SH2 is a space where the stock of the products T is stored. A product display shelf 410, a stock shelf 420, and a product transfer apparatus 1 are provided in the store.

As shown in FIGS. 2(a) and 2(b), the product display shelf 310 has a plurality of shelf plates 411 (also referred to as the levels of the product display shelves). A plurality of types of products T are placed on the shelf plate 411. For example, the products T of the same type are arranged in two rows or three rows. The products T may be arranged in only one row. A plurality of partition plates 412 dividing the products T arranged in each row are provided on the upper surface of each of the shelf plates. In FIG. 2, an example of products T of the same type arranged in two rows is illustrated, and in this example, a partition plate 412 is provided for every two rows of products T. The layout of the partition plate 412 is not limited to the above example, and the partition plate 412 can be arranged at intervals of one row or two or more rows.

The front side of the product display shelf 410 faces the in-store space SH1. So, customers can take products T from the front side of the product display shelf 410. The shelf plate 411 is inclined such that the front side gets lower relative to the back side. In the structure, when a customer takes a product T, other products T arranged behind the product T slide on the shelf plate 411, and move toward the front side.

The back side of the product display shelf 410 faces the backyard space SH2. So, a store employee or the product transfer apparatus 1 can replenish the product display shelf 410 with the products T from the back side of the product display shelf 410. Although not shown in the drawings, doors may be provided on the front and back sides of the product display shelf 410. In FIG. 1, though only one product display shelf 410 is drawn for simplicity of illustration, a plurality of product display shelves 410 may be provided in the store.

The stock shelf 420 is provided to face the product display shelf 410, and the front surface of the stock shelf 420 and the back surface of the product display shelf 410 face each other. As in the case of the product display shelf 410, the stock shelf 420 includes a plurality of shelf plates (levels) disposed in the height direction. Replenish target products as target products of replenishment for the product display shelf 410 are arranged on the shelf plate of the stock shelf 420. The replenishment target products may be arranged by a store employee, or the product transfer apparatus 1.

<Structure of the Product Transfer Apparatus 1>

Figure 3:
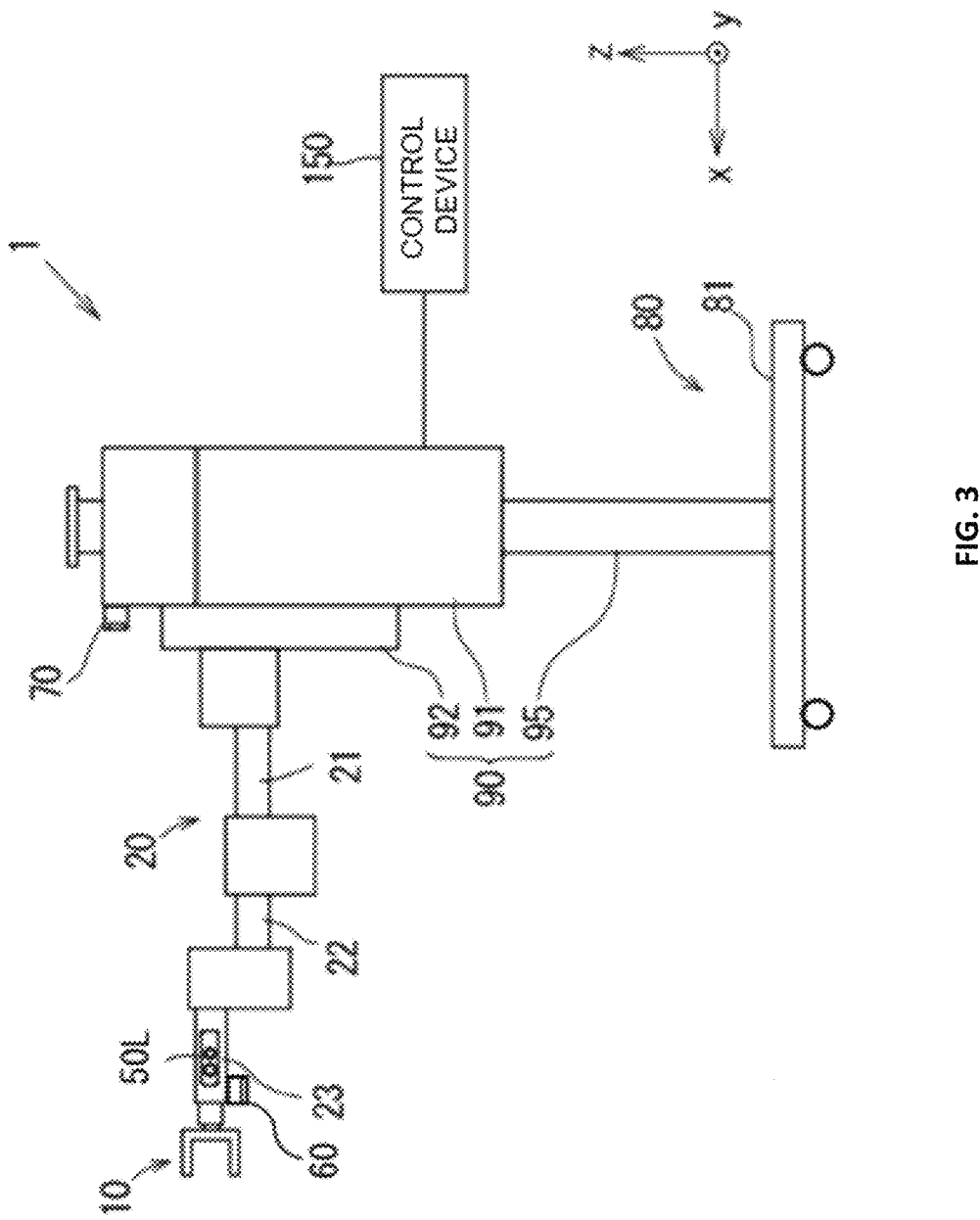
FIG. 3 is a side view schematically showing structure of the product transfer apparatus.
Figure 4:
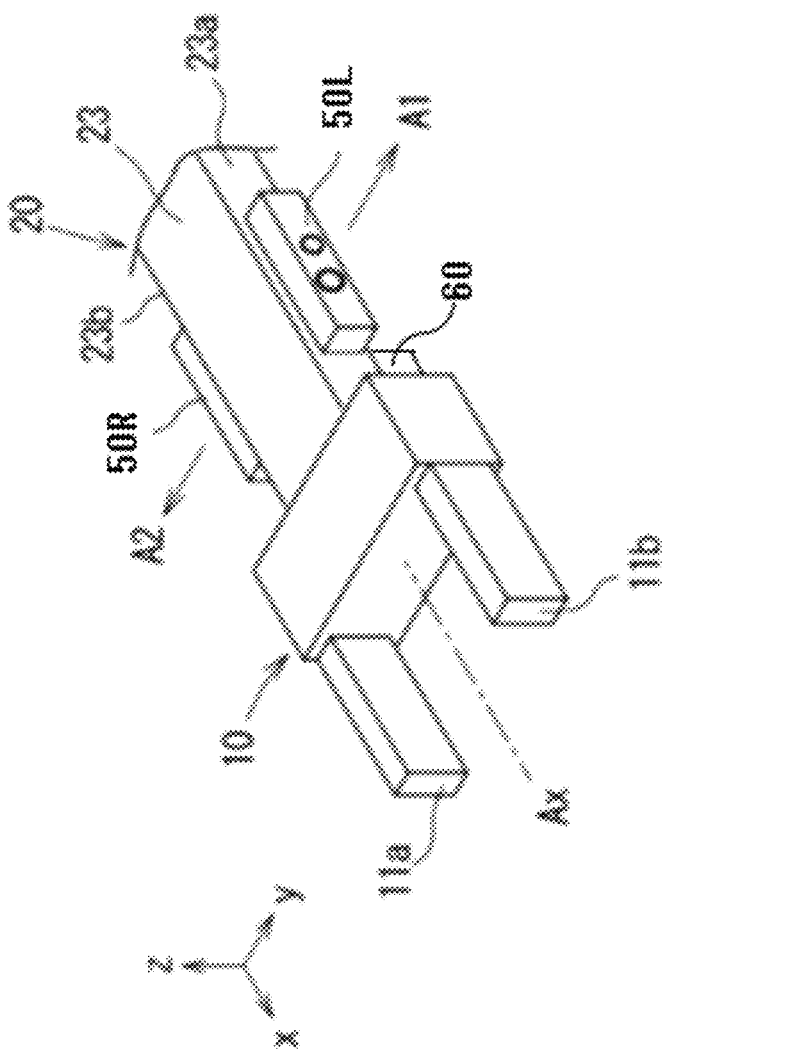
FIG. 4 is a perspective view showing structure around a front end of an arm unit of the product transfer apparatus.
Figure 5:
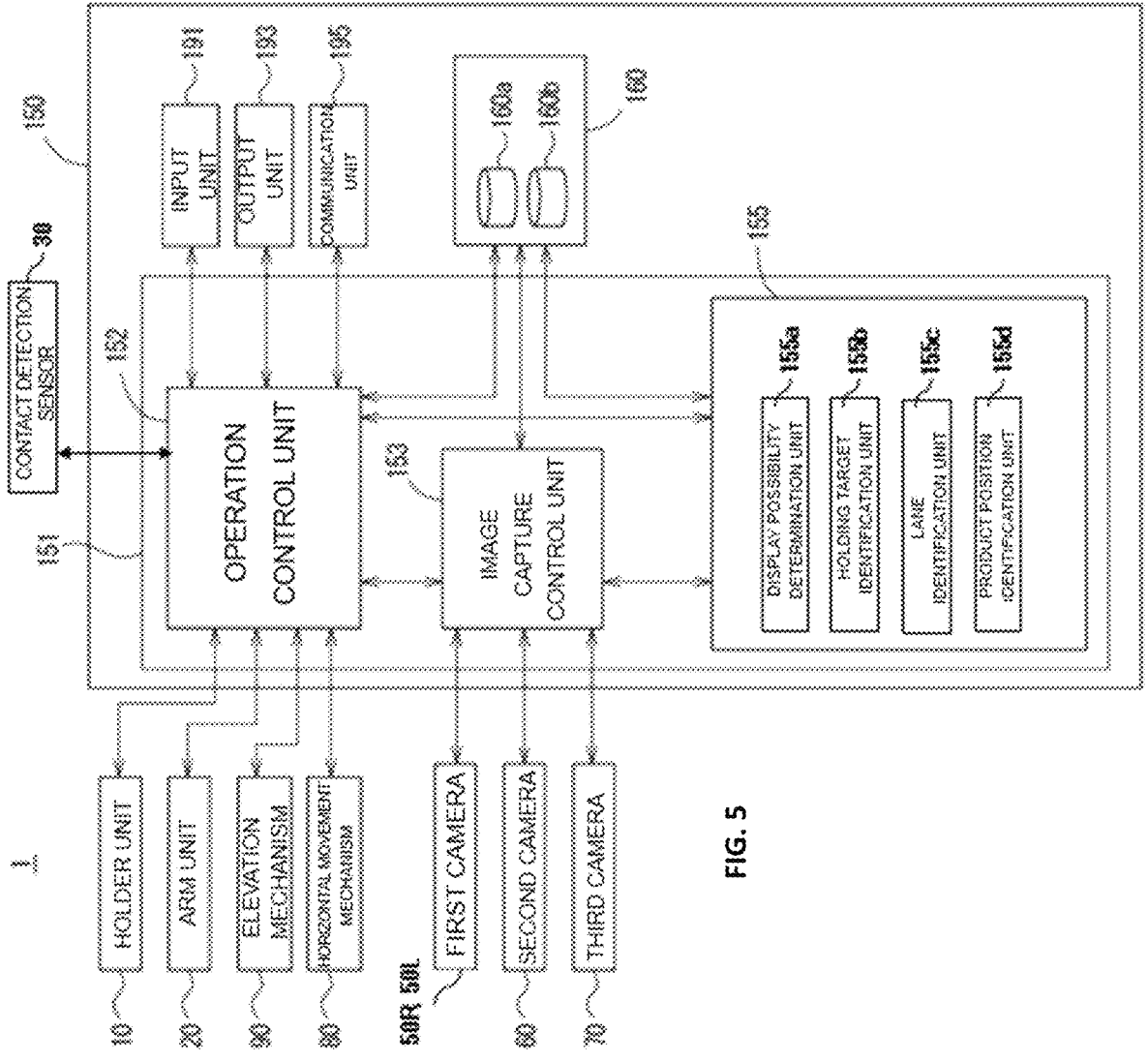
FIG. 5 is a block diagram showing structure of the product transfer apparatus.

The product transfer apparatus 1 will be described with reference to FIGS. 1, and 3 to 5. FIG. 3 is a side view schematically showing structure of the product transfer apparatus 1. FIG. 4 is a perspective view showing structure around a front end of an arm unit of the product transfer apparatus 1. FIG. 5 is a block diagram showing structure of the product transfer apparatus 1.

The product transfer apparatus 1 includes a holder unit 10, an arm unit 20, a contact detection sensor 30, first cameras 50R, 50L, a second camera 60, a third camera 70, a horizontal movement mechanism 80, an elevation mechanism 90, and a control device 150. The product transfer apparatus 1 is a robot which moves in a space between the product display shelf 410 and the stock shelf 420. The product transfer apparatus 1 holds a product T in the stock shelf 420 by the holder unit 10, and thereafter, moves the product T held by the holder unit 10 to a display position of the product, of the product display shelf 410 (lane which displays the product T).

As shown in FIG. 4, the holder unit 10 includes a pair of holder members 11a, 11b for holding a target object. The pair of holder members 11a, 11b have a shape configured to hold the product T which is a PET bottle beverage at a position near the cap member Tb. Further, the pair of holder members 11a, 11b have a shape configured to hold an outer peripheral portion of the product T which is a canned beverage. The holder unit 10 may not be formed by the pair of holder members 11a, 11b. Alternatively, the holder unit 10 may be configured to hold a target object by adsorption or may be configured to hold a target object by using an adhesive force, a magnetic force, etc.

The arm unit 20 includes a plurality of link members 21, 22, 23. The plurality of link members 21, 22, 23 form a multi-joint robot arm. For example, the multi-joint robot arm may be a 6-axis arm with degrees of freedom in a straight direction along each of the X, Y, and Z axis directions, and with degrees of freedom in each of the directions about the X, Y, and Z axes. The multi-joint robot arm may have any other mechanism, such as an orthogonal coordinate system robot arm, a polar coordinate system robot arm, a cylindrical coordinate system robot arm, or a SCARA robot arm. One end of the arm unit 20 is fixed to the elevation mechanism 90. The holder unit 10 is provided at a front end of the arm unit 20. Operation of the arm unit 20 is controlled by the control device 150.

The arm unit 20 can move the holder unit 10 toward the stock shelf 420 or toward the product display shelf 410 by moving respective link members 21, 22, 23. The orientation of the arm unit 20 is not fixed to a certain direction. However, for the sake of explanation, the direction in which the respective link members 21, 22, 23 are extended will be referred to as the extension direction Ax of the arm unit 20 (see FIG. 4). The arm unit 20 moves the holder unit 10 forward toward the product T to hold the product T. The extension direction Ax of the arm unit 20 corresponds to the forward direction of the holder unit 10 in the holding operation.

The contact detection sensor 30 is a sensor which detects that the product T held by the holder unit 10 contacts the shelf plate 411 at the time of placing the product T held by the holder unit 10 on the shelf plate 411 of the product display shelf 410. For example, a torque sensor, an acceleration sensor, an inertial measurement unit (IMU), a motor input current sensor, etc. can be used as the contact detection sensor 30.

For example, a strain gauge can be used as a torque sensor to detect the torque generated in the shaft of each joint of the arm unit 20. Various types of acceleration sensors, such as capacitance type or piezoresistive type, mounted on the holder unit 10 or the arm unit 20 can be used as the acceleration sensors.

The inertial measurement unit (IMU) is a device which detects three-dimensional inertial motion (translational and rotational motion in three orthogonal axes), and the inertial measurement unit (IMU) is equipped with an acceleration sensor to detect translational motion and an angular velocity (gyro) sensor to detect rotational motion. Among these sensors, the gyro sensor can be used to detect angular velocity to obtain the angle or angular change of the target object. For example, in the case where gears or gears and toothed belts are used as drive transmission means for the wrist portion of the holder unit 10, the motion of the wrist portion of the holder unit 10 can have redundancy due to play between gears or stretching of the toothed belt. So, for example, during the operation of placing the product T held by the holder unit 10 on the shelf plate 411 of the product display shelf 410, in the state where the product T is in contact with the upper surface of the shelf plate 411, if an additional force is applied to the holder unit 10 by moving the arm unit 20 further, as a result, some displacement will be caused in the wrist portion of the holder unit 10, and the posture (i.e., angle) of the holder unit 10 changes. Therefore, such angular changes which may occur in the holder unit 10 during the operation of placing the product T on the shelf plate 411 can be detected by the IMU mounted on the holder unit 10 to detect that the product T has come into contact with the shelf plate 411.

In the case where a servomotor etc. is used to drive each joint of the arm unit 20, when an external force which causes an angle deviation from the angle at which the holding posture is maintained occurs, the servomotor operates to keep the angle deviation at zero in order to maintain the original angle. In the state where the product T held by the holder unit 10 is in contact with the upper surface of the shelf plate 411 of the product display shelf 410, at the time of moving the arm unit 20 further, current is input to the servomotor to drive the servomotor in opposition to the load. Therefore, by detecting the current inputted to the servomotor for such operation using the motor input current sensor, it is possible to detect that the product T is in contact with the upper surface of the shelf plate 411. For example, the motor input current sensor may be in the form of a control unit 151 (see FIG. 5) described later.

Two first cameras 50R, 50L are provided on both of the left and right sides of the arm unit 20, respectively. The first cameral 50L mounted on the first side surface 23a which is the left side of the arm unit 20 is oriented in a first orientation A1 along a direction perpendicular to the extension direction of the arm unit 20 (see FIG. 4). The first camera 50L is used for mainly capturing an image of the product display shelf 410. The first camera 50R mounted on a second side surface 23b which is the right side of the arm unit 20 in parallel to the first side surface 23a and opposite to the first side surface 23a is oriented in a second orientation A2 which is opposite to the first orientation A1. The first camera 50R is used for mainly capturing an image of the stock shelf 420. As described above, the first cameras 50R, 50L are disposed in opposite directions to each other. Therefore, while keeping the arm unit 20 in the same posture, it is possible to capture images of the product display shelf 410 and the stock shelf 420 by the first cameras 50R, 50L, respectively, at the same time.

The performance of the first camera 50R and the performance of the first camera 50L may be the same, or may be different. Hereinafter, for the purpose of brevity of description, an example where both of the cameras have the same performance will be described. It should be noted that the purpose and/or the condition of capturing the image of the product display shelf 410 and the purpose and/or the condition of capturing the image of the stock shelf 420 are different. Therefore, it is a matter of course that cameras having different performances may be used depending on the respective purposes and conditions.

For example, the first cameras 50R, 50L may have an image capture element and a depth sensor. The image capture element generates a capture image (RGB image in one example) in which pixels are arranged in two dimensions. The depth sensor is a distance detection device for generating distance data. The depth sensor is not limited to a certain type as long as the depth sensor is capable of obtaining data of the distance to the target object. For example, the depth sensor may use a stereo lens system or a LiDAR (Light Detection and Ranging) system. For example, the depth sensor may generate Depth images. In other embodiments of the present disclosure, either or both of the first cameras 50R, 50L may, for example, utilize an ultrasonic element to obtain the distance data.

It should be noted that the first camera 50L is oriented in the first orientation A1. This means that the image capture direction of the image capture element and the depth sensor of the first camera 50L is the orientation A1. Likewise, the second camera 60 is oriented in the second orientation A2. This means that the image capture direction of the image capture element and the depth sensor of the first camera 50R is in the orientation A2. The orientations A1 and A2 do not necessarily have to be 180° opposites to each other, as long as the orientations A1 and A2 allow image capturing of the product display shelf 410 and the stock shelf 420.

One or both of the first cameras 50L, 50R may be provided on the holder unit 10. The first cameras 50L, 50R may not necessarily be provided on the same member. For example, the first camera 50R may be mounted on one of the link members 21 to 23, and the first camera 50L may be mounted on another one of the link members 21 to 23. However, in the case where the first cameras 50L, 50R are provided on the same member, in comparison with the case where the cameras 50L, 50R are provided on separate link members, respectively, there is an advantage that image processing computation is simplified because a common coordinate system is used.

The second camera 60 is used to capture an image showing the state where the holder unit 10 holds the product T, and the positional relationship between the product T held by the holder unit 10 and the shelf plate 411 of the product display shelf 410. As in the case of the first cameras 50R, 50L, the second camera 60 may have an image capture element and a depth sensor. The image capture element generates a capture image (RGB image in one example) in which pixels are arranged in two dimensions. The depth sensor generates distance data.

For example, the second camera 60 may be provided below the link member 23 closest to the holder unit 10, among the link members 21 to 23 of the arm unit 20, at a position close to the holder unit 10. The image capturing direction of the imaging element and the depth sensor of the second camera 60 are oriented directly downward (in the −z direction in FIGS. 3 and 4) or downward forward (somewhat more +x direction than in the −z direction in FIGS. 3 and 4) of the link member 23 and the holder unit 10. In the structure, the second camera 60 can capture at least a lower portion of the product T held by the holder unit 10 and the shelf plate 411 positioned on the front side of the holder unit 10.

The third camera 70 is a camera for capturing an image of a predetermined target object by changing the orientation, e.g., in accordance with operation of an operator at a remote location. For example, the third camera 70 is mounted on part of the elevation mechanism 90. The third camera 70 is capable of moving horizontally and vertically in a space between the product display shelf 410 and the stock shelf 420, in accordance with operation of the horizontal movement mechanism 80 and the elevation mechanism 90. Further, the portion of the elevation mechanism 90 on which the third camera 70 is mounted is rotatable about a pillar 95, and the third camera 70 is configured to rotate and move left and right about the pillar 95 as the portion rotates, and capture the image of the product display shelf 410 and capture the image of the stock shelf 420 as necessary.

For example, the third camera 70 may adopt a stereo lens system. Although not limited, the third camera 70 may have a wide angle of view in comparison with the first cameras 50L, 50R and the second camera 60.

The horizontal movement mechanism 80 has a base plate 81 and a drive mechanism (not shown). The base plate 81 supports the elevation mechanism 90, and slides along a rail (not shown) provided between the product display shelf 410 and the stock shelf 420 in the store. The drive mechanism (not shown) includes a motor, a roller, etc., and operates based on a control signal from the control device 150 (see FIG. 5) to move the elevation mechanism 90 to a predetermined position along the rail 450.

The elevation mechanism 90 has the pillar 95, a first elevation mechanism 91, and a second elevation mechanism 92. The pillar 95 is fixed on the base plate 81 and extends in the vertical direction.

The first elevation mechanism 91 has a drive mechanism (not shown). The drive mechanism (not shown) includes a motor and a linear guide, and operates based on a control signal from the control device 150 (see FIG. 5). By operating the drive mechanism (not shown), the first elevation mechanism 91 moves vertically up and down along the pillar 95. The upper portion of the first elevation mechanism 91, to which the third camera 70 is attached, is configured to be driven to rotate in the left-right direction about the pillar 95.

The second elevation mechanism 92 is held by the first elevation mechanism 91. One end of the arm unit 20 is attached to the second elevation mechanism 92. The second elevation mechanism 92 has a drive mechanism (not shown). The drive mechanism (not shown) includes a motor, a linear guide, etc., and operates based on a control signal from the control device 150 (see FIG. 5). By operating the drive mechanism (not shown), the second elevation mechanism 92 also moves vertically up and down.

In the case of holding a product T which is present at a predetermined height, the elevation mechanism 90 moves the arm unit 20 and the holder unit 10 by the first elevation mechanism 91 to a height around which the product T can be held, and finely adjusts the height of the arm unit 20 and the holder unit 10 by the second elevation mechanism 92.

In the present embodiment, the first elevation mechanism 91 and the second elevation mechanism 92 are provided as elevation mechanisms. However, in other embodiments of the present disclosure, only one elevation mechanism may be provided.

<Structure of the Control Device 150>

As shown in FIG. 5, the control device 150 has the control unit 151, a memory unit 160, an input unit 191, an output unit 193, and a communication unit 195. In FIG. 5, though the control device 150 is drawn as a single element, the control device 150 does not necessarily have to be a physically single element, but may be composed of a plurality of elements that are physically separated from each other.

The input unit 191 is a device for receiving input from the operator. The input unit 191 may be made up of devices such as a keyboard, a mouse, a touch panel, etc. for providing input to a computer. The input unit 191 may have an audio input device such as a microphone. The input unit 191 may have a gesture input device which recognizes and identifies operator's movements through image recognition.

The output unit 193 is used for allowing the product transfer apparatus 1 to output an alert to a store employee, etc. For example, the output unit 193 is made up of one of, or a combination of devices such as a speaker, a display, a light-emitting deice, and a vibration device. The communication unit 195 has a function of receiving data from the outside and transmitting data to the outside. In the case where the product transfer apparatus 1 is configured to be operated remotely, an input from the operator through an operation unit of an external device (not shown) is received by the communication unit 195, and the control device 150 allows the product transfer apparatus 1 to perform a predetermined operation based on the input. Communication between the operation unit of the external device and the communication unit 195 may be either wired communication or wireless communication.

In the case where the product transfer apparatus 1 is configured to be operated remotely, the input unit 191 may be a device worn by the operator. The device includes a display device (not shown) and an operation device (not shown). The display device has a display which is visible to the operator. For example, the display device may be a head mount display (HMD). For example, the operation device may include one or more input sensors which can detect movement of the operator's body parts (e.g., hands and arms).

The memory unit 160 includes a transitory or non-transitory storage medium such as a ROM (Read Only Memory), a RAM (Random Access Memory) and a HDD (Hard Disk Drive). The memory unit 160 stores computer programs executed by the control unit 151, and/or learned models, etc., which will be described later. The computer programs stored in the memory unit 160 includes an instruction for performing a method of controlling the product transfer apparatus 1 by the control unit 151, which will be described later with reference to FIGS. 8 and 9, etc.

The memory unit 160 includes an acquisition data memory unit 160a and a reference data memory unit 160b. The acquisition data memory unit 160a stores capture image data, etc. captured by each of the cameras 50R, 50L, 60, 70. The reference data memory unit 160b stores various items of data necessary for operation of the product transfer apparatus 1. The various items of data include data regarding the product display shelf 410 and the stock shelf 420 (various items of shape data, position data, or lane coordinate data, etc.), data regarding the product T (shape data, position data, etc.). In the present embodiment, the data regarding the reference position height of each shelf plate 411 of the product display shelf 410, and data regarding the height interval between the shelf plates 411 are stored in the reference data memory unit 160b.

The control unit 151 is made up of one, or two or more CPUs (Central Processing Unit). The control unit 151 functions as an operation control unit 152, an image capture control unit 153, and an image data processing unit 155 by executing a computer program stored in the memory unit 160.

The operation control unit 152 generates control signals for operating each of the holder unit 10, the arm unit 20, the horizontal movement mechanism 80, the elevation mechanism 90, and the control device 150. The operation control unit 152 generates the control signals with reference to input signals from the input unit 191 and/or various items of data stored in the memory unit 160. Generation of the control signal may be performed by using the processing results of the image data processing unit 155. The operation control unit 152 transmits/receives data via the communication unit 195, and generates a predetermined output via the output unit 193.

The image capture control unit 153 controls operation of each of the cameras 50R, 50L, 60, 70. The image capture timing, etc. of each of the cameras 50R, 50L, 60, 70 may be determined using data stored in the reference data memory unit 160b in advance.

The image data processing unit 155 performs various items of information processing using capture image data and the distance data (depth data) captured by image capturing by each of the cameras 50R, 50L, 60, 70. For example, the image data processing unit 155 analyzes an image of image data captured by the first camera 50R, and identifies the products arranged on the stock shelf 420. The image data processing unit 155 has a display possibility determination unit 155a, a holding target identification unit 155b, a lane identification unit 155c, and a product position identification unit 155d.

Figure 6:
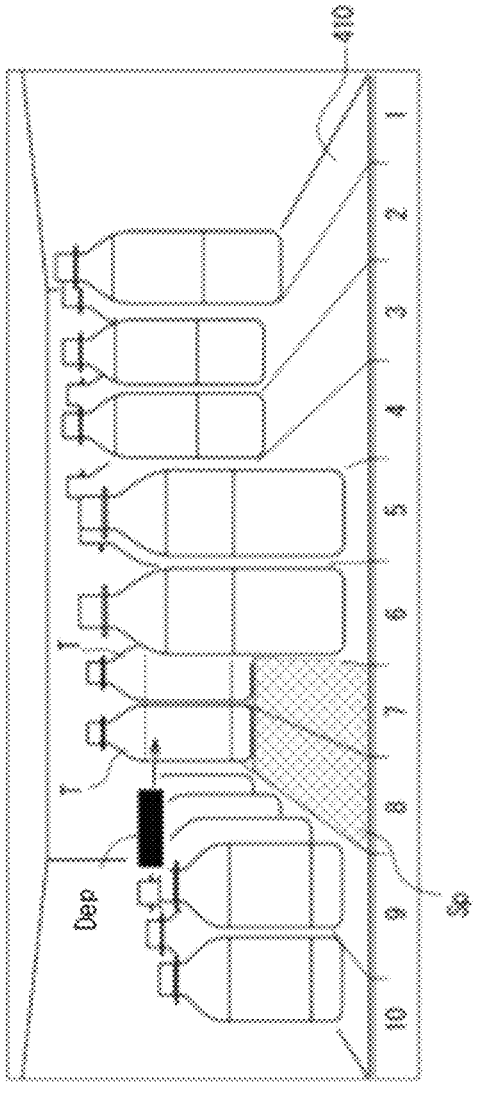
FIG. 6 is an image of a product display shelf captured by a first camera (left side) of the product transfer apparatus.

Based on at least one of the capture image data generated by image capturing of the first camera 50L and the distance data, the display possibility determination unit 155a determines, for example, whether or not a space Sp (see FIG. 6) is present to place more products behind the rearmost product T arranged on the product display shelf 410. FIG. 6 shows an image of the product display shelf 410 captured by the first camera 50L of the product transfer apparatus 1. If a space Sp is present, it means that the product T needs to be replenished. Therefore, if the space Sp is present, the display possibility determination unit 155a transmits a notification indicating that the product T should be replenished on the shelf plate 411 below the space Sp, to the operation control unit 152. In the case where the operation control unit 152 receives this notification, the operation control unit 152 performs replenishment operation for the product T.

Based on at least one of the capture image data captured by the first camera 50R and the distance data, the holding target identification unit 155b performs at least one of determination of whether or not the replenishment target product as a holding target is present in the stock shelf 420, identification of the size or shape of the replenishment target product, and determination of a holding position of the replenishment target product. In the case where the product T has the cap member Tb as shown in FIG. 1, for example, the holding target identification unit 155b sets a position near the cap member Tb as the holding position. In the case where the product T does not have the cap member Tb, the holding target identification unit 155b may set a side portion of the container as the holding position.

The lane identification unit 155c analyzes an image of the back side of the product display shelf 410 captured by the product transfer apparatus 1, and identifies the coordinate of each lane on the shelf plate 411 and the central position of each lane (central position in the width direction of each lane). Further, the lane identification unit 155c may identify the coordinate of the product T on the product display shelf 410. Further, the lane identification unit 155c may add an image of a dot, etc., at a position in the image corresponding to the identified coordinate.

The product position identification unit 155d analyzes image data of a capture image captured by the second camera 60 when the product T held by the holder unit 10 moves to a position above the front side of the shelf plate 411 at the display destination, of the product display shelf 410, and identifies the height of the reference position of the product T held by the holder unit 10 relative to the upper surface of the shelf plate at the display destination, and identifies the relationship between the reference position height of the shelf plate 411 at the display destination and the height of the reference position of the product T held by the holder unit 10.

Figure 7:
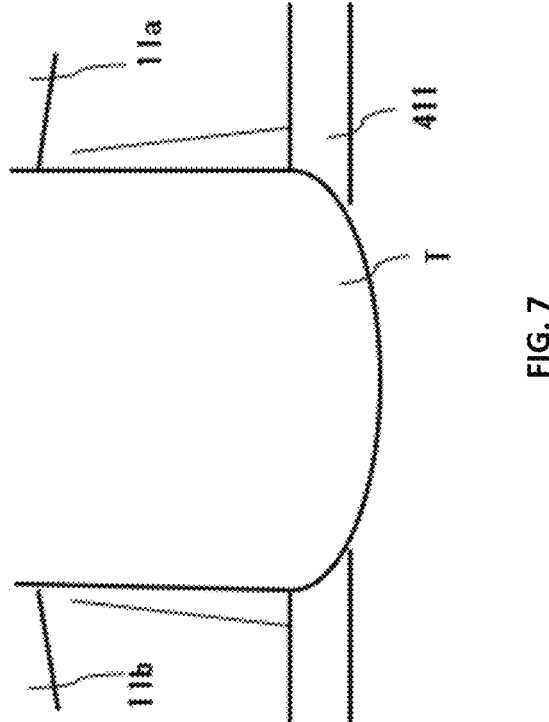
FIG. 7 is a view showing an example of a capture image captured when a product held by a holder unit is moved to a position on the front side of a product placement position of a shelf plate of the product display shelf.

FIG. 7 is a view showing an example of a capture image captured when a product T held by the holder unit 10 is moved to a position on the front side of the shelf plate 411 of the product display shelf 410. As shown in FIG. 7, the product position identification unit 155d analyzes the capture image using an arbitrary image analyzing process, and for example, based on the contour shape of the lower portion of the product T shown in the capture image and the upper surface of the shelf plate 411 at the display destination shown in the same capture image, calculates the height Hb of the bottom surface of the product T held by the holder unit 10, relative to the upper surface of the shelf plate 411 (see FIG. 10). In the case where the distance (depth) data is also obtained by the second camera 60, the product position identification unit 155d may use the data for detection of the height positions of the product T and the shelf plate 411.

For example, the product position identification unit 155d identifies the part of the contour shape of the lower portion of the product T which protrudes the most on the lower side, using an arbitrary image recognition technique, and recognizes the height position as the position of the bottom surface of the product T. Further, the product position identification unit 155d determines the height Hb of the bottom surface of the product T relative to the upper surface of the shelf plate 411 in the capture image by image analysis of the capture image using the arbitrary image analysis process. At this time, it is also possible to use the depth data obtained by the second camera 60.

In particular, the holding target identification unit 155b of the image data processing unit 155 identifies the products arranged on the stock shelf 420, identifies the product T as the replenishment target, and performs at least one of the processes of determining the size or the shape of the product T and the process of determining the holding position of the replenishment target product. Therefore, the image data processing unit 155 obtains information regarding type, the size (the overall height, the largest diameter, etc.) or the shape of the product T as the replenishment target held by the holder unit 10. The product position identification unit 155 refers to the overall height of the product T in the size information of the product T included in the information obtained by the image data processing unit 155 (in particular, the holding target identification unit 155b), and adds the value of the overall height to the height Hb of the bottom surface of the product T relative to the upper surface of the shelf plate 411 in the capture image obtained as described above to determine the height Ht of the uppermost end of the product T relative to the upper surface of the shelf plate 411 (see FIG. 10). For example, in the case where the overall height of the product T is 20 cm, the height of the uppermost end of the product T is the height position of 20 cm from the bottom surface.

Figure 10:
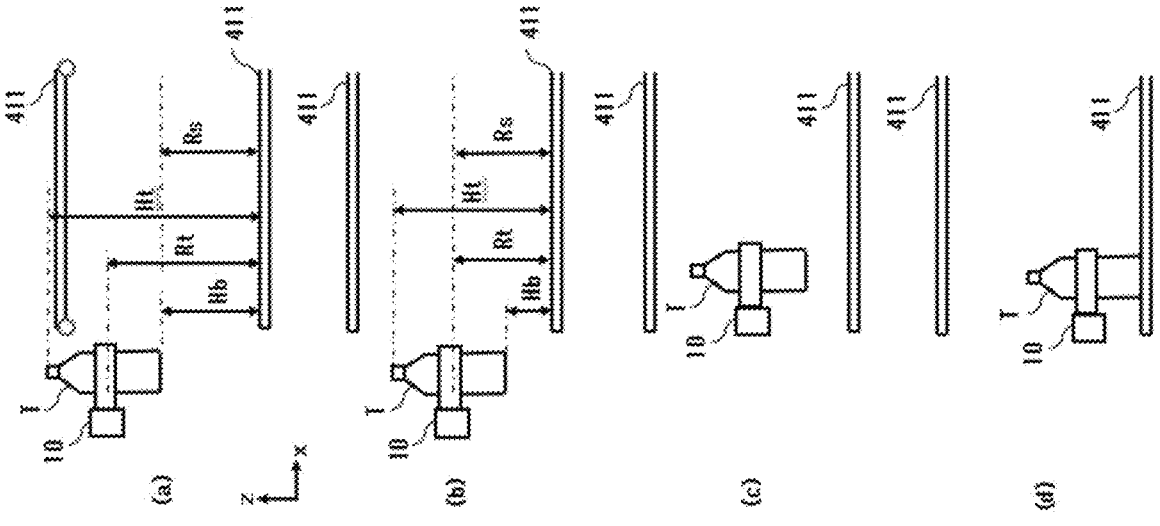
FIG. 10 is a view schematically showing various positional relationships between the product and the shelf plate in each operation in the first operation example of the product transfer apparatus.

Further, the product position identification unit 155d determines the height of an intermediate position between the height Hb of the bottom surface of the product T held by the holder unit 10 and the height Ht of the uppermost end of the product T, as determined above, as the reference position height Rt of the product T relative to the upper surface of the shelf plate 411 at the display destination (see FIG. 10).

On the other hand, data regarding the reference position height Rs of each shelf plate 411 of the product display shelf 411 is stored in the reference data memory unit 160b, and the reference position height Rs of each shelf plate 411 is known in the system of the product transfer apparatus 1. The product position identification unit 155d can obtain the reference position height Rs of the shelf plate 411 at the display destination of the product T, from the data regarding the reference position height Rs of each shelf plate 411 stored in the reference data memory unit 160b. For example, the reference position height Rs of each shelf plate 411 may be the intermediate height (predetermined height) from the shelf plate 411 at the display destination to the shelf plate 411 of the upper level (ceiling plate of the product display shelf 410 in the case where the lower shelf plate 411 is at the uppermost level). The shelf plates 411 of the product display shelf 410 may have uniformly the same reference position height Rs, or each of the shelf plates 411 of the product display shelf 410 may have a different reference position height Rs. For example, in the present embodiment, the height interval between the shelf plates 411 of the product display shelf 410 is 24 cm, and the reference position height Rs of each shelf plate 411 is 12 cm which is the half of the height interval.

The product position identification unit 155d compares the height Rt of the intermediate position (reference position) of the product T relative to the upper surface of the shelf plate 411 at the display destination with the reference position height Rs of the shelf plate 411 at the display destination, obtained as described above. In this manner, the product position identification unit 155d can identify in which direction (upper or lower) and by which distance the reference position height Rt of the product T deviates from the position height Rs relative to the shelf plate 411, as the relationship between the reference position height Rt of the product T and the reference position height Rs of the shelf plate 411.

In the above description, an example of, as the reference position height Rt of the product T, using the height of the intermediate position of the product T, and as the reference position height Rs relative to the shelf plate 411, using the height of the intermediate position between the shelf plate 411 and the shelf plate 411 one level above or the ceiling plate has been explained. However, these reference positions are not limited to this example. For example, as the reference position height Rt of the product T, the height of the bottom surface or the upper end of the product T may be used as a reference, and as the reference position height Rs relative to the shelf plate 411, the height of the upper surface of the shelf plate 411 may be used as a reference.

As necessary, based on the identification result, the operation control unit 152 moves the holder unit 10 to correct the position of the product T in the height direction, in a manner that, at the time of inserting the product T between the upper and lower shelf plates 411, the product T does not contact the shelf plates 411. Further, in order to prevent falling over of the product T due to the impact when the product T placed above the shelf plate 411 is released by the holder unit 10, and dropped onto the shelf plate 411, after contact of the product T on the shelf plate 411 is detected by the contact detection sensor 30 while operating the holder unit 10 and the arm unit 20 for placing the product T on the shelf plate 411, the operation control unit 152 controls the holder unit 10 to perform operation of releasing the product T.

(Product Replenishment Operation by the Product Transfer Apparatus 1)

Figure 8:
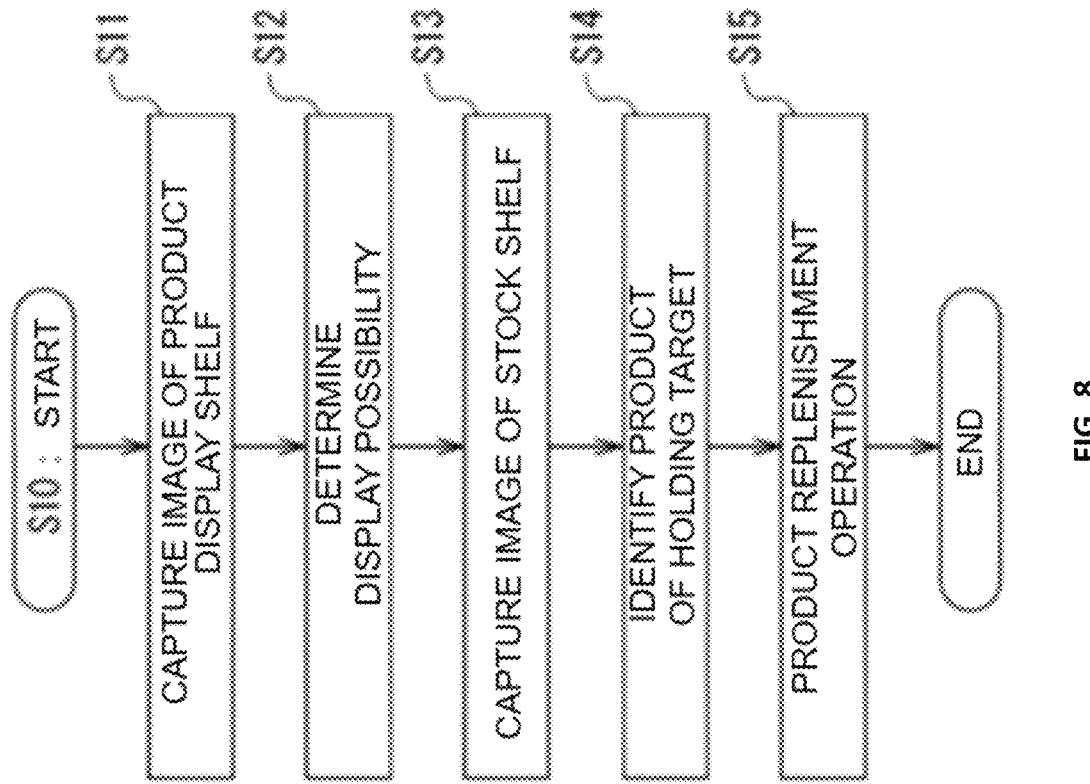
FIG. 8 is a flow chart showing replenishment operation of the product by the product transfer apparatus.

FIG. 8 is a flow chart showing operation of replenishing the product T by the product transfer apparatus 1.

Firstly, in step S11, the first camera 50L mounted on the arm unit 20 of the product transfer apparatus 1 captures the image of the back side of the product display shelf 410. The product transfer apparatus 1 moves the arm unit 20, the horizontal movement mechanism 80, and the elevation mechanism 90 in a manner that an image of each level of the product display shelf 410 can be captured by the first camera 50L. Next, the product transfer apparatus 1 operates the first camera 50L to obtain an image of the back side of the product display shelf 410, and obtain the data of distance (distance data) to the product T arranged on the product display shelf 410.

Next, in step S12, display possibility determination is made. The "display possibility determination" is a step performed by the display possibility determination unit 155a in the image data processing unit 155 of the product transfer apparatus 1 to determine which products T can be displayed (in other words, which products T need to be replenished) on which shelf plate 411 by analyzing the captured image of the back side of the product display shelf. The product transfer apparatus 1 obtains the image of the back side of the product display shelf 410 as shown in FIG. 6.

The lane identification unit 155c in the image data processing unit 155 of the product transfer apparatus 1 identifies the lane on the shelf plate 411 at the display destination, of the product display shelf 410 using the capture image captured by the first camera 50L. Further, since the image data processing unit 155 of the product transfer apparatus 1 can obtain data of the distance to the product T (depth data Dep visually shown in FIG. 6), it is possible to recognize the presence of a space Sp behind the product T for items such as the products T in lanes "7" and "8", where the number of displayed products has been decreased. The display possibility determination unit 155a of the product transfer apparatus 1 determines whether or not there is the space Sp for the product T based on the data of the distance to the product T, and whether or not more products T can be displayed in the lanes "7" and "8". By the process of step S12, it is determined which products T need to be replenished on which shelf plate 411 of the product display shelf 410.

It should be noted that the method of determining whether or not products need to be replenished is not limited to the method described above, and various methods can be used. For example, it may be possible to determine what percentage of the products T are arranged in a given three-dimensional space and determine that the products T need to be replenished if the value is less than a predetermined standard value.

Next, in step S13, the image of the stock shelf 420 is captured. The product transfer apparatus 1 operates the arm unit 20, the horizontal movement mechanism 80, the elevation mechanism 90, and the first camera 50R to capture the image of the stock shelf 420 from the front side. For example, the product transfer apparatus 1 captures an image of the stock shelf 40 one level at a time, and obtains the capture image indicating the stock condition of the product T. It is not essential to perform image capturing of the stock shelf 420 after the image of the product display shelf 410 is captured, and image capturing of the stock shelf 420 may be performed before the image of the product display shelf 410 is captured.

Next, in step S14, the image data processing unit 155 of the product transfer apparatus 1 analyzes the image of the stock shelf 420 obtained in step S13 to identify the products arranged on the stock shelf 420. Further, the holding target identification unit 155b of the image data processing unit 155 identifies the holding position of the product. By the processes up to this point, information indicating which products T at which positions of which shelf plate 411 of the product display shelf 410 need to be replenished, information indicating the positions of the replenishment target products on the stock shelf 420 corresponding to the products T, and the holding positions of the replenishment target products are obtained by the product transfer apparatus 1.

Next, in step S15, the product transfer apparatus 1 performs product replenishment operation (pick-and-place operation) based on the above obtained information. Specifically, the operation control unit 152 of the control unit 151 of the product transfer apparatus 1 (see FIG. 5) operates the arm unit 20, the horizontal movement mechanism 80, and the elevation mechanism 90 to move the holder unit 10 toward a predetermined product replenishment target on the stock shelf 420. Then, the holder unit 10 holds the holding position of the replenishment holding target product which has been identified beforehand, and, lifts replenishment target product. Then, the operation control unit 152 operates the arm unit 20, the horizontal movement mechanism 80, and the elevation mechanism 90 to move the held product T to a predetermined placement position on the product display shelf 410, and releases the product T from the holder unit 10 to place the product T at the predetermined position. Thereafter, the product transfer apparatus 1 repeats the pick-and-place operation in the same manner to complete replenishment of the products T.

The above series of processes are the basic operations of the product transfer apparatus 1 for automatically replenishing the products T from the stock shelf 420 to the product display shelf 410. In the product replenishment operation (pick-and-place operation) in step S15 of the series of processes as described above, at the time of displaying the product T on the lower shelf plate of the product display shelf 410 having the two upper and lower shelf plates, in the state where the product is at a height where the product contacts either the upper or lower shelf plate, if operation to move the product onto the shelf plate 411 is performed, the product T may contact the edge on the front side of the shelf plate, and it becomes impossible to move the product further, or the product T may be detached from the holder unit 10. Further, even in the case where the product can be placed above the shelf plate 411, if the distance between the bottom surface of the product T and the upper surface of the shelf plate 411 is large, and in this state, if the holder unit 10 performs operation of releasing the product T to place the product T on the shelf plate 411, the product T may fall over due to the impact when the product T dropped onto the shelf plate 411. The present embodiment provides means for preventing contact of the product T with the shelf plate 411 in the product replenishment operation (pick-and-place-operation). Further, the present embodiment provides means for preventing falling over of the product T in the operation of placing the product T on the shelf plate 411 due to the impact when the product T dropped on the shelf plate 411.

First Operation Example

FIG. 9 is a flow chart showing a first operation example of the product transfer apparatus 1 of the present embodiment. FIG. 10 is a view schematically showing various positional relationships between the product T and the shelf plate 411 in each operation in the first operation example of the product transfer apparatus 1.

Firstly, in step S21, the operation control unit 152 of the control unit 151 (see FIG. 5) of the product transfer apparatus 1 operates the holder unit 10, the arm unit 20, the horizontal movement mechanism 80, and the elevation mechanism 90, and hold the product T as the replenishment target of the stock shelf 420 to move the product T to a position above the front side of the shelf plate 411 as the display target of the product display shelf 410. The step S21 corresponds to operation up to the middle of step S15 described above.

Next, in step S22, the capture image control unit 153 (see FIG. 5) of the control unit 151 of the product transfer apparatus 1 performs image capturing by the second camera 60. Thus, the capture image including at least the lower portion of the product T held by the holder unit 10 and the shelf plate 411 positioned below the front side of the holder unit 10, and the distance data are obtained by the second camera 60. The obtained capture image and the obtained distance data are stored in the acquisition data memory unit

160*a* of the memory unit 160. As shown in FIG. 7, the capture mage obtained by the second camera 60 includes at least a lower portion of the product T held by the holder unit 10 and at least a portion of the shelf plate 411 at the display destination positioned below the front side of the product T.

Next, in step S23, the product position identification unit 155*d* in the image data processing unit 155 of the product movement apparatus 1 obtains the reference position height Rt of the product T positioned above the front side of the shelf plate 411 at the display destination and the reference position height Rs of the shelf plate 411 at the display destination relative to the shelf plate 411, and identifies the relationship between the reference position height Rt of the product T and the reference position height Rs of the shelf plate 411 at the display destination.

In step S23, as described above with reference to FIG. 7, for example, the product position identification unit 155*d* identifies the part of the contour shape of a lower portion of the product T which protrudes the most on the lower side, using an arbitrary image recognition technique, and recognizes the height position of the part as the position of the bottom surface of the product T. Further, the product position identification unit 155*d* determines the height Hb of the bottom surface of the product T relative to the upper surface of the shelf plate 411 in the capture image by image analysis of the capture image using an arbitrary image analysis process. Further, based on information about the size or the shape of the product T of the replenishment target obtained by the image data processing unit 155 (in particular, the holding target identification unit 155*b*), the product position identification unit 155*b* determines the height Ht at the uppermost end of the product T relative to the upper surface of the shelf plate 411 at the display destination in the capture image, and determines the height Rt of the reference position (intermediate position) of the product T relative to the upper surface of the shelf plate 411 the display destination, based on the height Hb of the bottom surface and the height Ht of the uppermost end of the product T.

Further, the product position identification unit 155*d* refers to data regarding the reference position height Rs of each shelf plate 411 stored in the reference data memory unit 160*b*, and obtains the reference position height Rs of the shelf plate 411 at the display destination.

Then, the product position identification unit 155*d* identifies the relationship between the reference position height Rt of the product T relative to the shelf plate 411 at the display destination and the reference position height Rs of the shelf plate 411. The product position identification unit 155*d* compares the reference position height Rt of the product T with the reference position height Rs of the shelf plate 411. In this manner, the product position identification unit 155*d* can identify in which direction (upper or lower direction) and by which distance the reference position height Rt of the product T deviates from the reference position height Rs of the shelf plate 411 at the display destination.

FIG. 10(*a*) shows a state where the product T is moved to a position on the front side of the shelf plate 411 at the display destination, of the product display shelf 410 in step S21. In the state shown in the drawing, for example, assuming that the interval between the upper and lower shelf plates 411 is 24 cm, the reference position height Rs of the shelf plate 411 is 12 cm, the reference position height Rt of the product T is 15 cm, and the overall height of the product T is 20 cm. It is possible to determine that the reference position height Rt of the product T deviates from the reference position height Rs of the shelf plate 411 by 3 cm in the upper direction (z-axis direction in the drawing). Further, the product position identification unit 155*d* refers to information about the type, the size or the shape of the product T as the replenishment target obtained by the image data processing unit 155 (in particular, the holding target identification unit 155*b*) and the data regarding the height interval between the shelf plates 411 stored in the reference data memory unit 160*b*. In this manner, it is possible to calculate that the height Ht at the uppermost end of the product T at this time becomes 25 cm by adding the half of the overall height of the product T which is 10 cm to the reference position height Rt of the product T which is 15 cm. Since the height of 25 cm is larger than the interval of 24 cm between the upper and lower shelf plates 411 (the height from the lower shelf plate 411 at the display destination to the upper shelf plate 411), if the product T is attempted to move in the x-axis direction in the drawing and inserted between the shelf plates 411, the upper portion of the product T contacts the edge of the front side of the upper shelf plate 411. Therefore, it is necessary to correct the position of the product T in the upper/lower direction (z-axis direction in the drawing) from the state shown in FIG. 10(*a*).

Next, in step S24, the operation control unit 152 of the product transfer apparatus 1 operates the holder unit 10, the arm unit 20, etc. to correct deviation of the reference position height Rt of the product T from the reference position height Rs of the shelf plate 411 at the display destination.

The operation control unit 152 operates the holder unit 10, the arm unit 20, etc. to move the product T in the upper/lower direction (z-axis direction in the drawing) until the reference position height Rt of the product T held by the holder unit 10 becomes the same as the reference position height Rs of the shelf plate 411 at the display destination, based on the relationship between the reference position height Rt of the product T relative to the shelf plate 411 at the display destination and the reference position height Rs of the shelf plate 411, identified by the product identification unit 155*d* in step S23. For example, in the above example, in the case where it is identified that the reference position height Rt of the product T deviates from the reference position height Rs of the shelf plate 411 by 3 cm in the upper direction (z-axis direction in the drawing), the product T is moved in the lower direction by 3 cm. In this manner, the product T is placed at the height position where the reference position height Rt becomes the same or substantially the same as the reference position height Rs of the shelf plate 411 at the display destination (see FIG. 10(*b*).

In the state where the height position of the product T is corrected in a manner that the reference position height Rt of the product T and the reference position height Rs of the shelf plate 411 become the same or substantially the same, in the above example, there is a gap of 12 cm−10 cm=2 cm between the uppermost end of the product T and the upper shelf plate 411, and likewise, there is a gap of 2 cm between the bottom surface of the product T and the lower shelf plate 411 of at the display destination.

Alternatively, in step S24, the product T may be moved in the upper or lower direction in a manner that the reference position height Rt of the product T becomes a height within a predetermined height range from the reference position height Rs of the shelf plate 411. For example, in the above example, a range of 1 cm in the upper direction and the lower direction from the reference position height Rs may be used as the predetermined range. In the case where the reference position height Rt of the product T is within such a predetermined range from the reference position height Rs of the shelf plate 411, a minimum gap of 1 cm is guaranteed between the uppermost end of the product T and the upper shelf plate 411, and between the bottom surface of the product T and the lower shelf 411 at the display destination, respectively.

Next, in step S25, the operation control unit 152 operates the holder unit 10 and the arm unit 20 to move the product forward (in the x-axis direction in the drawing) between the upper and lower shelf plates 411 and place the product T above the placement position of the shelf plate 411 (see FIG. 10(*c*)).

As described above, in step S24, in the state where the height position of the product T is corrected in a manner that the reference position height Rt of the product T and the reference position height Rs of the shelf plate 411 become the same or substantially the same, in the above example, there is a gap of 2 cm between the uppermost end of the product T and the upper shelf plate 411, and likewise, there is a gap of 2 cm between the bottom surface of the product T and the lower shelf plate 411 at the display destination. Further, in the state where the height position of the product T is corrected in a manner that the reference position height Rt of the product T becomes the height within a predetermined range from the reference position height Rs of the shelf plate 411, in the above example, a minimum gap of 1 cm of is guaranteed between the uppermost end of the product T and the upper shelf plate 411, and between the bottom surface of the product T and the lower shelf 411 at the display destination, respectively. Therefore, it is possible to move the product T forward (in the x-axis direction in the drawing) between the upper and lower shelf plates 411, without contact of the product T with the upper and lower shelf plates 411.

Lastly, in step S26, the operation control unit 152 operates the holder unit 10 and the arm unit 20 to place the product T at the placement position on the shelf plate 411 at the display destination (see FIG. 10(*d*). More specifically, the operation control unit 152 operates the holder unit 10 and the arm unit 20 to move the product T downward from the placement position in step S25 until the contact detection sensor 30 detects that the product T held by the holder unit 10 contacted the shelf plate 411, As described above, as the contact detection sensor 30, various detection means such as the torque sensor, the acceleration sensor, the inertial measurement unit (IMU), and the motor input current sensor can be used. By detecting input values (e.g., a torque value, an acceleration value, an angular velocity value, a current value, etc.) or the change of the input values to the detection means, it is possible to detect the contact of the product T held by the holder unit 10 with the shelf plate 411 as the placement target. When the contact detection sensor 30 detects that the product T contacted the shelf plate 411, the operation control unit 152 stops operation of the holder unit 10 and the arm unit 20 to move the product T downward, and performs operation of releasing the product T from the holder unit 10 to place the product T at the placement position on the shelf plate 411. The operation of releasing the product T from the holder unit 10 corresponds to release operation in the operation of step S15 described with reference to FIG. 8. As described above, in the state where the product T contacts the shelf plate 411 of the placement target, by performing operation of releasing the product T from the holder unit 10, it is possible to prevent falling over of the product T due to the impact when the product T drops onto the shelf plate 411.

In the above description, in step S21, in the state where the product T is moved to the front side of the shelf plate 411 of the placement target of the product display shelf 410, in the case where the reference position height Rr of the product T deviates from the reference position height Rs of the shelf plate 411 at the display destination, in step 24, operation of correcting the height position of the product T is performed. However, depending on the degree of the deviation amount, the correction amount may be omitted. In the above example, assuming that the reference position height Rt of the product T and the reference position height Rs of the shelf plate 411 are the same, there is a gap of 12 cm–10 cm=2 cm between the uppermost end of the product T and the upper shelf plate 411, and likewise, there is a gap of 2 cm between the bottom surface of the product T and the lower shelf plate 411 as the placement target. In this case, if the deviation amount between the reference position height Rt of the product T and the reference position height Rs of the shelf plate 411 is less than plus or minus 2 cm, even of operation of directly moving the product T forward in a manner that the product T is inserted between the upper and lower shelf plates 411 is performed, the product T does not contact the shelf plates 411. As described above, in the case where the deviation amount between the reference position height Rt of the product T and the reference position height Rs of the shelf plate 411 at the display destination is within a range of the gap which may be formed between the product T and the upper and lower shelf plates 411 in consideration of the distance between the upper and lower shelf plates 411 and the overall height of the product T, it is possible to omit correction operation of the height position of the product T.

Second Operation Example

In the above described first operation example, based on the image data captured by the second camera 60, the product position identification unit 155*d* of the product transfer apparatus 1 identifies the relationship between the reference position height Rt of the product T held by the holder unit 10 and positioned above the front side of the shelf plate 411 at the display destination relative to the shelf plate 411 and the reference position height Rs of the shelf plate 411, and based on the identification result, the operation control unit 152 of the product transfer apparatus 1 operates the holder unit 10, the arm unit 20, etc. to correct the height of the product T, and thereafter, insert the product T between the shelf plate 411 and its upper shelf plate 411. In contrast, in the second operation example, the product position identification unit 155*d* of the product transfer apparatus 1 provides means for identifying the relationship between the reference position height Rt of the product T held by the holder unit 10 and positioned above the front side of the shelf plate 411 relative to the shelf plate 411, and the reference position height Rs of the shelf plate 411, using a learned model generated in machine learning.

The learned model used to identify the relationship between the reference position height Rt of the product T held by the holder unit 10, and positioned above the front side of the shelf plate 411 at the display destination relative to the shelf plate 411, and the reference position height Rs of the shelf plate 411 can be generated in machine learning by an arbitrary learning machine comprising a computer, using teaching data and learning data. For example, the teaching data comprises various types of image data and/or depth data including the product T held by the holder unit 10 and the shelf plate 411 captured by the second camera 60 as described above, in the state where the product T held by the holder unit 10 is positioned above the front side of the shelf plate 411, and annotation information regarding the relationship between the reference position height Rt of the product T and the reference position height Rs of the shelf plate 411 associated with each data. The learning data comprises image data and/or depth data including the product T held by the holder unit 10 and the shelf plate 411.

Such a learned model can be generated, for example, by performing machine learning on a neural network comprising multiple layers including neurons in each layer. Deep neural networks, such as convolutional neural networks (CNN: Convolutional Neural Network) having 20 or more layers, may be used as such neural networks. The machine learning using such deep neural networks is referred to as deep learning. The learned model generated in this manner is stored in the memory unit 160 of the product transfer apparatus 1 and implemented as a functional module of the product position identification unit 155*d* of the product transfer apparatus 1.

Figure 11:
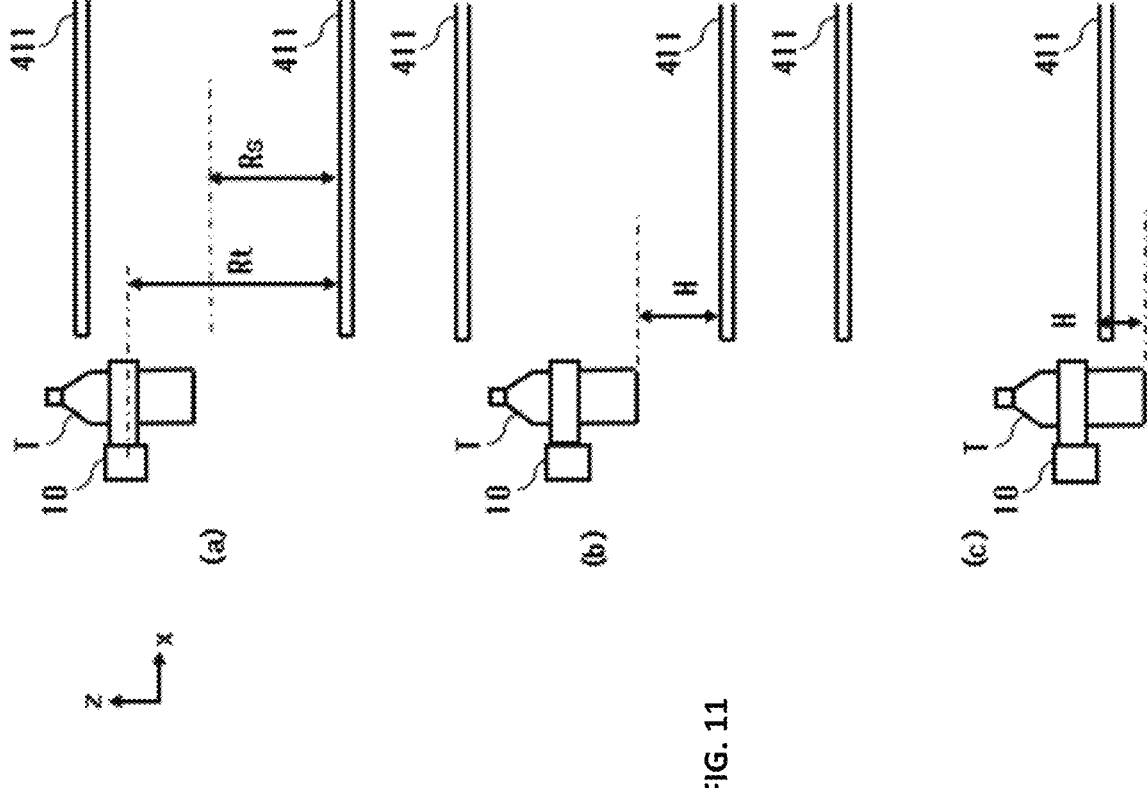
FIG. 11 is a conceptual view showing examples of various positional relationships between a product held by the holder unit, and placed on the front side of the placement position and the shelf plate, captured by the second camera of the product transfer apparatus.

FIG. 11 is a conceptual view showing an example of various positional relationships between the product T held by the holder unit 10 and placed on the front side of the shelf plate 411, captured by the second camera 60 of the product transfer apparatus 1.

In FIG. 11(*a*), the reference position height Rt of the product T positioned above the front side of the shelf plate 11 relative to the shelf plate 411 deviates by 4 cm in the upper direction in the drawing (z-axis direction), from the reference position height Rs of the shelf plate 411 at the display destination. The image data in the state shown in FIG. 11(*a*) is associated with "deviation direction: z-axis direction, deviation amount: 4 cm, contact with the upper shelf plate", as annotation information regarding the relationship between reference position height Rt of the product T and the reference position height Rs of the shelf plate 411, and used as teaching data.

In FIG. 11(*b*), the reference position height Rt of the product T positioned above the front side of the shelf plate 411 relative to the shelf plate 411 deviates by 1 cm in the upper direction in the drawing (z-axis direction) from the reference position height Rs of the shelf plate 411 at the display destination. The image data in the state shown in FIG. 11(*b*) is associated with "deviation direction: z-axis direction, deviation amount: 1 cm, no contact", as annotation information regarding the relationship between the reference position height Rt of the product T and the reference position height Rs of the shelf plate 411, and used as teaching data.

Further, in FIG. 11(*c*), the reference position height Rt of the product T relative to the shelf plate 411 deviates from the reference position height Rs of the shelf plate 411 at the display destination by 3 cm in the lower direction in the drawing (–z axis direction). The image data in the state shown in FIG. 11(*b*) is associated with "deviation direction: –z axis direction, deviation amount: 3 cm, contact with the lower shelf plate", and used as teaching data.

As described above, the teaching data comprises a plurality of items of image data and/or depth data indicating the relationship between the product T held by the holder unit 10 and positioned above the front side of the shelf plate 411 at the display destination relative to the shelf plate 411 and the reference position height Rs of the shelf plate 411, and the annotation information regarding the relationship between the reference position height Rt of the product T and the reference position height Rs of the shelf plate 411 associated with each data. The annotation information may further include information regarding the interval between the upper and lower shelf plates 411, and the shape and/or size of the product T.

In this example, the product position identification unit 155*d* of the product transfer apparatus 1, in which the learned model described above is implemented as a functional module, instead of performing the process of step S23 described in the first operation example, identifies, using the learned model described above, for the image of the image data captured by the second camera 60, the relationship between the reference position height Rt of the product T held by the holder unit 10 and positioned above the front side of the shelf plate 411 at the display destination relative to the shelf plate 411, and the reference position height Rs of the shelf plate 411. In this example, since the above relationship is identified using the learned model, compared to the case where the above relationship is identified from image data, etc. by executing a process using the image recognition technique as in the first operation example, it is possible to reduce the calculation cost, and increase the processing speed.

In the same manner as in step S24 described in the first operation example, based on the positional relationship between the reference position height Rt of the product T and the reference height Tr of the shelf plate 411, the having the largest occurrence probability value among the obtained occurrence probability values regarding the three states as the position of the product T in the image data of the processing target.

In accordance with the position correction operation content associated in advance with each state of the height position of the product T and the occurrence probability value, the operation control unit 152 of the product transfer apparatus 1 operates the holder unit 10 and the arm unit 20, etc. so as to correct the deviation of the reference position height Rt of the product T relative to the reference position height Rs of the shelf plate 411, and move the product T in the upper or lower direction (along the z-axis in FIG. 11). Then, the operation control unit 152 performs operation of steps S25 and S26 described with reference to FIG. 9, and places the product T at the placement position on the shelf plate 411.

Table 1 below shows an example of a lookup table which associates each state of the height position of the product T and the occurrence probability value with the contents of the position correction operation. This lookup table is stored beforehand in the memory unit 160 of the product transfer apparatus 1.

TABLE 1

| Occurrence probability value | (1) No contact | (2) Contact with lower shelf plate | (2) Contact with upper shelf plate |
|---|---|---|---|
| 0.9~1.0 | No height correction | Move 3 cm upward | Move 3 cm downward |
| 0.8~less than 0.9 | No height correction | Move 2 cm upward | Move 2 cm downward |
| 0.7~less than 0.8 | No height correction | Move 1 cm upward | Move 1 cm downward |
| 0.6~less than 0.7 | No height correction | Move 5 mm upward | Move 5 mm downward |
| less than 0.6 | Notify operator | Notify operator | Notify operator | operation control unit 152 of the product transfer apparatus 1 in this example also operates the holder unit 10 and the arm unit 20, etc. to correct the deviation of the reference position height Rt of the product T relative to the reference height Rt of the shelf plate 411, and moves the product T in the upper or lower direction (along the z-axis in FIG. 11) until the reference position height Rt of the product T held by the holder unit 10 becomes the same or substantially the same as the reference position height Rs of the shelf plate 411. Then, the operation control unit 152 of the product transfer apparatus 1 executes the operation of steps S25 and S26 described above, and places the product T at the placement position on the shelf plate 411.

It should be noted that, as a modified example of the second operation example, the product position identification unit 155*d* of the product transfer apparatus 1 may be configured to identify the relationship between the reference position height Rt of the product T held by the holder unit 10 and positioned above the front side of the shelf plate 411 at the display destination relative to the shelf plate 411, and the reference position height Rs of the shelf plate 411, according to the magnitude of the probability value generated as a result of performing the certain process using the learned model described above.

For example, for the image data captured by the second camera 60, the product position identification unit 155*d* uses the above learned model to determine, as the height position of the product T placed on the front side on the shelf plate 411, the occurrence probability value regarding the three states of: (1) No contact with the shelf plates (area between the upper and lower shelf plates), (2) Contact with the lower shelf plate, and (3) Contact with the upper shelf plates. The product position identification unit 155*d* adopts the state The above example will be explained below. For example, it is assumed that the state with the largest value among the occurrence probability values for the three states is "(1) No contact" and the occurrence probability values are 0.9 to 1.0, 0.8 to less than 0.9, 0.7 to less than 0.8, and 0.6 to less than 0.7. The product T is at the height between the upper and lower shelf plates 411, and the probability where the product T does not contact either the upper shelf plate 411 or the lower shelf plate 411 at the is 60% or more. Therefore, the position correction operation content is set to "No height correction". So, if these conditions are satisfied, the height correction operation of the product T by the operation control unit 152 is not performed, and the operation of inserting the product T between the upper and lower shelf plates 411 at the height position is performed.

Further, among the occurrence probability values for the three states, if the state having the largest occurrence probability value is "(2) Contact with the lower shelf plate", the movement distance for height correction of the product T is set according to the occurrence probability value. In the case where the occurrence probability value is 0.9 to 1.0, which is the largest, since the product T is probably positioned at a position closer to the lower shelf plate 411, the movement distance to the reference position height Rs of the shelf plate 411 is set to "move 3 cm upward" which is relatively large. As the occurrence probability values get smaller, such as 0.8 to less than 0.9, 0.7 to less than 0.8 and 0.6 to less than 0.7, it becomes less probable that the product T is placed at the position close to the lower shelf plate 411. In other words, since it becomes more probable that the reference position height Rt of the product T is substantially equal to the reference position height Rs of the shelf plate 411, the movement distance to the lane center associated with the occurrence probability values is set successively smaller, such as 2 cm, 1 cm, 5 mm. Also, in the case where the state with the largest value among the occurrence probability values for the three states is "(3) Contact with the upper shelf plate", the setting is made in the same manner, but the direction of movement for height correction of the product T is opposite to the above, i.e., the "lower direction".

It should be noted that, in the case where the state with the largest value among the occurrence probability values for the three states is less than 0.6, the position of product T may not have been correctly identified because the accuracy of identifying the position of the product T is relatively low. Therefore, the product transfer apparatus 1 sends a notification indicating inability to identify the position from the communication unit 195 to an external device (not shown) used by the operator. Upon receiving the notification, the operator of the device can remotely operate the product transfer apparatus 1 with the external device, obtain image data from the second camera 60 to check the height of the product T, and as necessary, remotely operate the holder unit 10 and the arm unit 20, etc. to correct the height position or take other actions.

Or, even in the case where the occurrence probability values for all three states are 0.6 or more, if the occurrence probability values are all relatively low, and close to each other, such as for example (1) "No contact" is 0.7, (2) "Contact with the lower shelf plate" is 0.6, and (3) "Contact with the upper shelf plate" is 0.7, it is difficult to identify the height position of the product T. Therefore, also in such cases, the product transfer apparatus 1 may also send a notification indicating inability to identify the position, from the communication unit 195 to the external device (not shown) used by the operator. On the other hand, even in the case where the occurrence probability values for all three states are less than 0.6, if the differences between the largest value and the other values are large, such as for example (1) "No contact" is 0.5, (2) "Contact with the lower shelf plate" is 0.001, and (3) "Contact with the upper shelf plate" is 0.001, the product position identification unit 155d may adopt the state of the largest value as the position state of the product T. It is possible, as necessary, to determine the criteria of issuing a notification indicating inability to identify the position even if all of the occurrence probability values are not less than 0.6 (for example, all of the occurrence probability values regarding the three states are within the error range of 10%, etc.) as in the former case, and/or the criteria of adopting the state of the largest value as the position state of the product T even if all of the occurrence probability value is less than 0.6 (for example, the largest occurrence probability value is 10 times or more larger than the other occurrence probability values) as in the latter case.

Each of the ranges of the probability of occurrence values and the position correction operations and the movement distances associated with these ranges are not limited to the examples listed in Table 1, but can be determined as necessary according to the details of the implementation such as the interval between the upper and lower shelf plates, and the shape/or size of the product as the replenishment target.

While the present disclosure has been described though embodiments of the invention, the embodiments are not intended to limit the scope of the invention as claimed. Further, any form of combination of the features described in the embodiments of the present disclosure may also be included in the technical scope of the invention. Furthermore, it is also apparent to those skilled in the art that various modifications or improvements can be made to the embodiments described above.

The invention claimed is:

1. A product transfer apparatus configured to move a product placed on a stock shelf to a product display shelf which is different from the stock shelf, the product transfer apparatus comprising:

an arm unit having a holder unit configured to hold the product;

an image capture unit configured to obtain image data including at least a portion of the product held by the holder unit for placing the product on a shelf plate of the product display shelf and placed above the front side of the shelf plate by the arm unit, and at least a portion of the shelf plate; and a control unit configured to control operation of the holder unit, the arm unit, and the image capture unit, wherein the control unit is configured to perform:

identifying, based on the image data, the relationship between the height of a reference position of the product from an upper surface of the shelf plate and the height of a reference position of the shelf plate; and correcting, based on the identified relationship, the height of the reference position of the product relative to the reference position of the shelf plate by operating the arm unit for moving the product.

2. The product transfer apparatus according to claim 1, wherein the correcting the height of the reference position of the product includes moving the product in a manner that the height of the reference position of the product becomes the height within a predetermined range from the height of the reference position of the shelf plate.

3. The product transfer apparatus according to claim 1, wherein the reference position of the product is an intermediate position of the overall height of the product, and the reference position of the shelf plate is a position of a predetermined height from an upper surface of the shelf plate.

4. The product transfer apparatus according to claim 1, wherein the identifying the height of the reference position of the product includes identifying the relationship using a learned model generated by machine learning beforehand using teaching data and learning data, wherein the teaching data comprises various types of image data and annotation information regarding the relationship between a reference position of the product from an upper surface of the shelf plate and the height of a refence position of the shelf plate associated respectively with the various types of image data, and the learning data comprises various types of image data which are different from the various types of image data of the teaching data.

5. The product transfer apparatus according to claim 4, wherein the correcting the height of the reference position of the product includes moving the product by a distance associated beforehand in correspondence with a probability value regarding the height of the reference position of the product identified by the learned model.

6. The product transfer apparatus according to claim 1, wherein the product transfer apparatus further comprises a contact detection sensor configured to detect contact of the product with the shelf plate at the time of placing the product on the shelf plate; and the control unit is configured to operate the arm unit to further perform:

moving the product having the corrected height of the reference position to a position above the placement position of the shelf plate;

moving the product moved to the position above the placement position toward the shelf plate until the contact detection sensor detects contact of the product with the shelf plate; and releasing holding of the product by the holder unit after detection of the contact of the product with the shelf plate by the contact detection sensor.

7. A method of controlling a product transfer apparatus for moving a product placed on a stock shelf to a product display shelf which is different from the stock shelf, the product transfer apparatus comprising:

an arm unit having a holder unit configured to hold the product;

an image capture unit configured to obtain image data including at least a portion of the product held by the holder unit for placing the product on a shelf plate of the product display shelf and placed above the front side of the shelf plate by the arm unit, and at least a portion of the shelf plate; and a control unit configured to control operation of the holder unit, the arm unit, and the image capture unit, and wherein the method is performed by the control unit and including:

identifying, based on the image data, the relationship between the height of a reference position of the product from an upper surface of the shelf plate and the height of a reference position of the shelf plate; and correcting, based on the identified relationship, the height of the reference position of the product relative to the reference position of the shelf plate by operating the arm unit for moving the product.

8. A non-transitory computer-readable storage medium storing a computer program, the computer program when executed by one or more processors, configures the one or more processors to control a product transfer apparatus to move a product placed on a stock shelf to a product display shelf which is different from the stock shelf, the product transfer apparatus comprising:

an arm unit having a holder unit configured to hold the product;

an image capture unit configured to obtain image data including at least a portion of the product held by the holder unit for placing the product on a shelf plate of the product display shelf and placed above the front side of the shelf plate by the arm unit, and at least a portion of the shelf plate; and a control unit configured to control operation of the holder unit, the arm unit, and the image capture unit, wherein the program allows the control unit to perform:

identifying, based on the image data, the relationship between the height of a reference position of the product from an upper surface of the shelf plate and the height of a reference position of the shelf plate; and correcting, based on the identified relationship, the height of the reference position of the product relative to the reference position of the shelf plate by operating the arm unit for moving the product.

* * * * *